United States Patent [19]

Bagby

[11] Patent Number: 4,674,831

[45] Date of Patent: Jun. 23, 1987

[54] SELF-CONTAINED OPTICAL FIBRE SWITCH

[75] Inventor: Robert J. Bagby, Evanston, Ill.

[73] Assignee: Ametek, Inc., New York, N.Y.

[21] Appl. No.: 536,941

[22] Filed: Sep. 28, 1983

Related U.S. Application Data

[63] Continuation-in-part of Ser. No. 422,076, Sep. 23, 1982, abandoned.

[51] Int. Cl.$^4$ ................................................. G02B 6/38
[52] U.S. Cl. ................................ 350/96.20; 350/96.21
[58] Field of Search ............... 350/96.15, 96.20, 96.21, 350/96.22; 250/227, 229, 211 K, 211 J, 231 P, 239, 551

[56] References Cited

U.S. PATENT DOCUMENTS

| | | | |
|---|---|---|---|
| 3,787,837 | 1/1974 | Allen et al. | 340/365 P |
| 3,949,219 | 4/1976 | Crouse | 250/229 |
| 4,023,887 | 5/1977 | Speers | 350/96.15 |
| 4,148,554 | 4/1979 | Magnusson et al. | 350/96.21 |
| 4,170,731 | 10/1979 | Howell et al. | 250/227 |
| 4,196,348 | 4/1980 | Iwakiri et al. | 250/229 |
| 4,223,217 | 9/1980 | Bongard et al. | 250/227 |
| 4,315,147 | 2/1982 | Harmer | 250/227 |
| 4,362,356 | 12/1982 | Williams et al. | 350/96.20 |
| 4,376,566 | 3/1983 | Blackington | 350/96.20 |

Primary Examiner—William L. Sikes
Assistant Examiner—Frank Gonzalez
Attorney, Agent, or Firm—Mason, Kolehmainen, Rathburn & Wyss

[57] ABSTRACT

An optical fibre cable switch is provided in which opposed cable end faces are precisely aligned coaxially while permitting standard optical fibre cable bushings to be used. An alignment member is first positioned within the central opening of the bushings. The aligned bushings are then cemented or glued to the switch housing while being held in alignment by the alignment member. The alignment member is then removed so that standard cable terminating ferrules may be inserted into the aligned bushings.

35 Claims, 21 Drawing Figures

SELF-CONTAINED OPTICAL FIBRE SWITCH

The present application is a continuation-in-part of Bagby application Ser. No. 422,076, filed Sept. 23, 1982, now abandoned.

The present invention relates to apparatus for controlling the transmission of light along optical fibre cables, and more particularly, to optical fibre switching apparatus of the type wherein an opaque shutter is inserted or withdrawn from between the opposed ends of closely spaced coaxially arranged optical fibre cables.

Various arrangements have been heretofore proposed for providing optical switching in which a shutter member intercepts a light beam between a light source and a light detector. Such optical switching arrangements are shown, for example, in Plaisance U.S. Pat. No. 3,235,741, Towne et al U.S. Pat. No. 3,783,274, Astier et al U.S. Pat. No. 3,906,222, Crouse U.S. Pat. No. 3,949,219, Okuda et al U.S. Pat. No. 4,122,337, Iwakiri et al U.S. Pat. No. 4,196,348, Speidel et al U.S. Pat. No. 4,251,723 and Everett U.S. Pat. No. 4,289,963.

In addition, certain other prior art arrangements have specifically proposed optical switching arrangements in conjunction with optical fibre cables wherein the shutter is movable between the opposed end faces of abutting optical fibre cables. Such optical fibre cable switching arrangements are shown, for example, in Higgins U.S. Pat. No. 3,614,402, Allen et al U.S. Pat. No. 3,787,837, Callaghan U.S. Pat. No. 3,999,074, Howell U.S. Pat. No. 4,170,731, and Bongard et al U.S. Pat. No. 4,223,217.

While the above-identified optical switching arrangements of the prior art are in general satisfactory for their intended purpose, they nevertheless suffer from certain disadvantages in that they are quite complicated and involve many moving parts, and are also not economical to manufacture on a mass production basis. Furthermore, many of the prior art optical fibre cable switching arrangements do not provide a switch in which the opposed cable ends are precisely coaxial. While Bongard et al U.S. Pat. No. 4,223,217 makes some attempt in this direction, the arrangement of this patent requires special bushings which are molded as a part of the switch module. Further, the Bongard et al arrangement is not completely self-contained, but rather contemplates a separate switch module which is mounted in an existing switch housing of the mechanically actuated switch type.

It is an object, therefore, of the present invention to provide a new and improved self-contained optical fibre switch which avoids one or more of the above-discussed difficulties of prior art optical fibre switches.

It is another object of the present invention to provide a new and improved optical fibre switch in which the opposed cable end faces are precisely aligned coaxially while permitting standard optical fibre cable bushings to be used.

It is a further object of the present invention to provide a new and improved method of assembling the components of an optical fibre cable switch wherein an alignment member is first positioned within the central openings of the bushings; the aligned bushings are then cemented or glued to the switch housing while being held in alignment by the alignment member, and the alignment member is then removed so that standard cable terminating ferrules may be inserted into the aligned bushings.

It is another object of the present invention to provide a new and improved optical fibre switch which is completely self-contained and can be mounted in the existing mounting holes of conventional electrical switches.

BRIEF DESCRIPTION OF THE DRAWINGS

The invention, both as to its organization and method of operation, together with further objects and advantages thereof, will best be understood by reference to the following specification taken in connection with the accompanying drawings, in which.

Referring now to the drawings, the optical fibre switch of the present invention is therein illustrated as comprising identical housing sections 10 and 12 which are assembled together by means of hollow rivets 14 and 16. The housing sections 10, 12 are additionally aligned by mating bosses 18 and corresponding apertures 20 in each housing section.

The holes provided in each housing section for the rivets 14, 16 are provided with recessed portions 22 (FIG. 5) so that when assembled the hollow rivets 14, 16 will be recessed to provide a flat, exterior mounting surface. The rivets 14, 16 are located and sized so that their inner openings will exactly match the mounting dimensions of existing electrical switches which the self-contained optical fibre switch of the present invention may replace.

Each of the housing sections 10, 12 is provided with an offset portion 24 which depends from the mid-portion of the housing, these offset portions 24 forming a mounting and positioning means for a pair of optical fibre bushings 26, 28. The bushings 26, 28 may be of any standard commercial type, such as AMP type 227390-1. The bushings 26, 28 are each provided with central openings comprising a tapered outer portion 30 and a central cylindrical portion 32, these central openings being adapted to receive the end portion 34 of conventional optical fibre cable terminating ferrules 36 made of resilient plastic material. The ferrules 36 are provided with outer flanges 38 which are held against the end faces of the bushings 26, 28 by means of the threaded end caps 40 so that the ferrules 36 are wedged in place into the openings 30, 32. An optical fibre cable 41 comprising a central silica core 42 and outer cladding or sheathing 44 is positioned within each of the ferrules 36 and is accurately centered relative to the bushing by means of the tapered openings 30. The cladding 44 does not extend all the way to the end of the cable 41, so that the end portion 46 of the central optical fibre core 42 extends through a corresponding opening in the end portion 34 of the ferrule 36. Each of the bushings 26, 28 is provided with a hexagonal end flange 48, the flange 48 of the bushing 26 being positioned between an inwardly extending shoulder 50, formed in the offset portion 24, and a central inwardly extending rib 52 also formed in the offset portion 24.

In a similar manner, the flange 48 of the bushing 28 is positioned between an inwardly extending annular shoulder 54 and the central rib 52. The end faces of the bushings 26, 28 and the opposed end faces of the optical fibre end portions 46 are thus spaced apart by the central shoulder 52 to form a slot 56 therebetween.

A shutter element 58 is slidably mounted in the housing sections 10, 12, the shutter element 58 extending through a slot 60 formed in the bottom wall of the housing sections 10, 12 and into the slot 56 formed between the end faces of the bushings 26, 28.

The edges of the shutter 58 are mounted in grooves 62 formed in bosses 64 extending along the sidewalls of the housing sections 10, 12 and the shutter 58 is moved vertically within the slots 62, 60 and 56 by means of a shutter blade actuating subassembly indicated generally at 66.

Figures 5, 6:
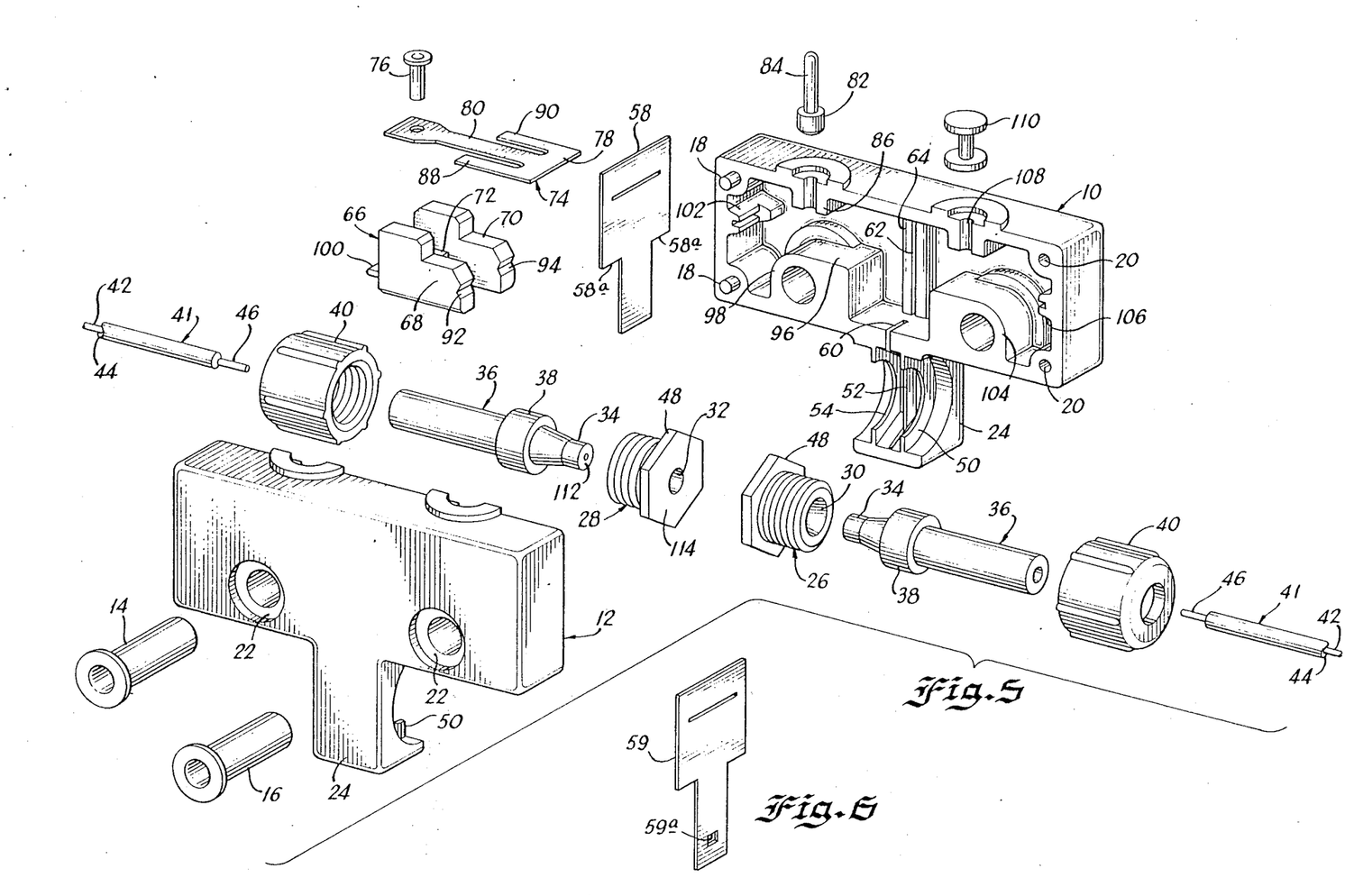
FIG. 5 is an exploded perspective view of the switch of FIG. 1.
FIG. 6 is an exploded view of a portion of the switch of FIG. 1 showing an alternative shutter arrangement.

As best illustrated in FIG. 5, the subassembly 66 comprises a pair of end walls 68, 70 which are spaced apart by a central connecting rib portion 72. A spring actuating arm 74 is secured to the central connecting rib 72 by means of the rivet 76, the outer free end portion 78 of the spring arm 74 extending through a horizontal slot in the shutter member 58. The central portion 80 of the spring arm 74 is adapted to be engaged by the head portion 82 of a switch actuator pin 84 which is slidably mounted in a boss portion 86 formed in the upper walls of the housing sections 10, 12. The spring arm 74 is also provided with a pair of offset bowed spring arm biasing portions 88, 90 which extend rearwardly from the end portion 78, the ends of the arm portions 88, 90 being positioned within notches 92, 94 formed in the sidewalls 68, 70. The arm portions 88, 90 are bowed downwardly so that the free end portion 78 is biased upwardly and holds the shutter 58 in the position shown in FIG. 2 in the absence of a force exerted on the actuator pin 84.

The subassembly 66 rests on the upper surface of a boss portion 98 formed in each of the housing sections 10, 12, to receive the rivets 14, 16. Also, the central rib portion 72 is provided with a retaining flange 100 which is positioned within a corresponding groove formed in the horizontal bosses 102 which are formed in the housing sections 10, 12.

Figures 1, 3:
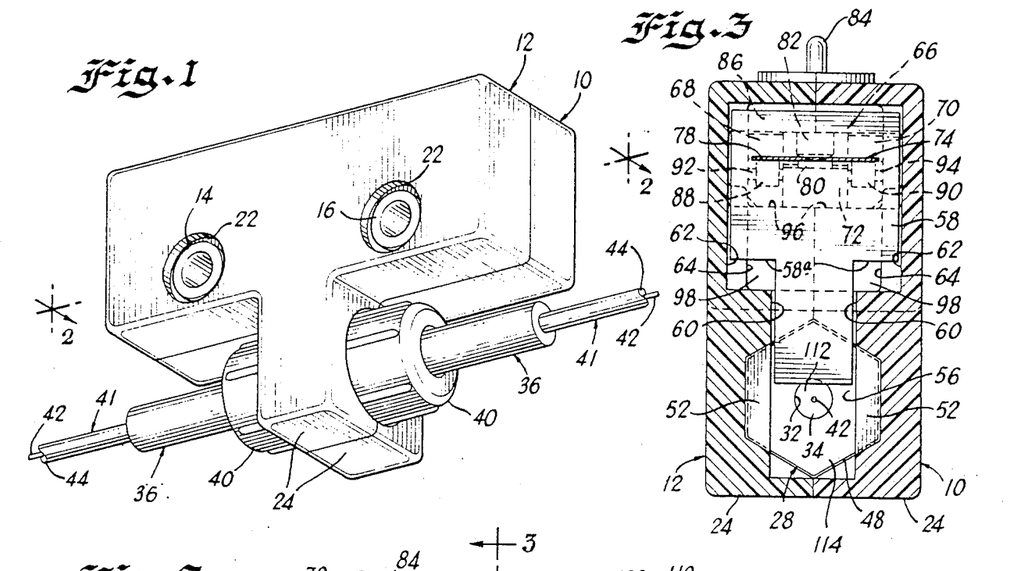
FIG. 1 is a perspective view of the optical fibre switch of the present invention.
FIG. 3 is a sectional view taken along the line 3—3 of FIG. 2.
Figure 2:
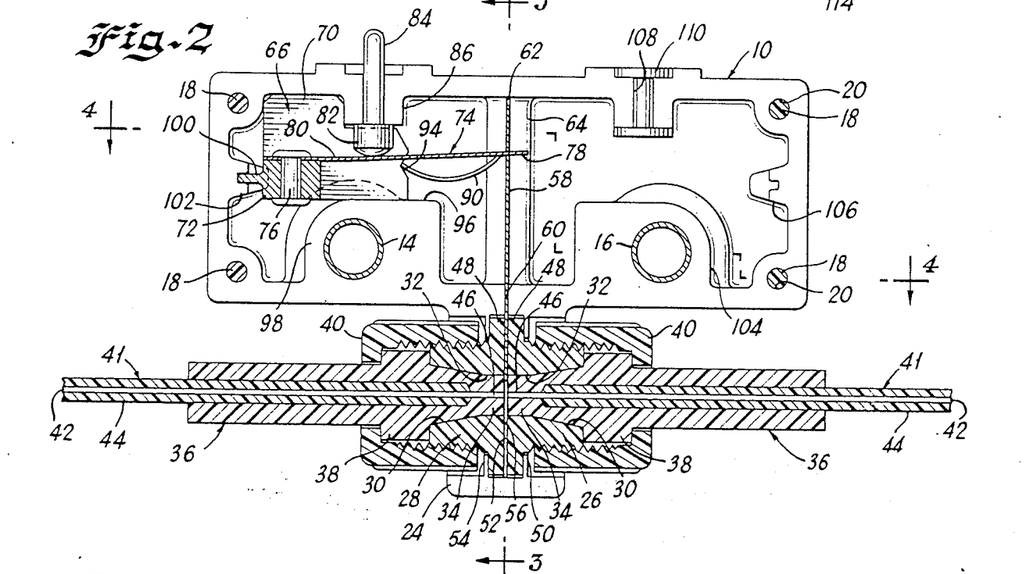
FIG. 2 is a cross-sectional view taken along the line 2—2 of FIG. 1.
Figure 4:
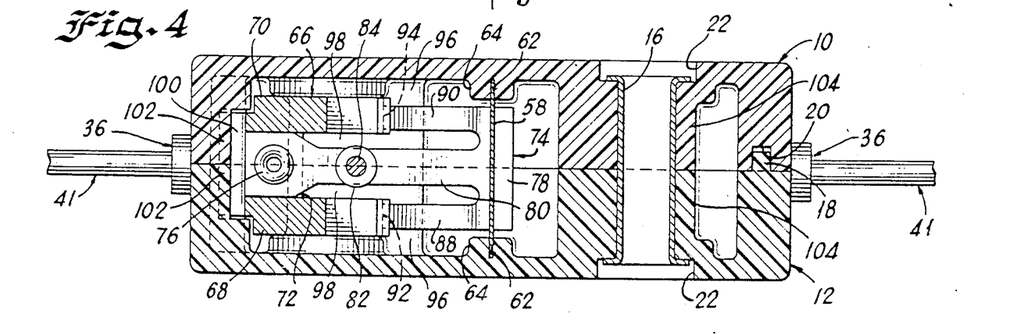
FIG. 4 is a sectional view taken along the line 4—4 of FIG. 2.

In this connection it will be noted that the housing sections 10, 12 are also provided with boss portions 104 and the horizontal groove portion 106 so that the shutter blade actuating subassembly 66 may be positioned within the housing sections 10, 12 on the other side of the shutter element 58, from that shown in FIG. 2. In such case the actuator pin 84 extends through a corresponding opening 108 in the top wall of the housing sections 10, 12, this opening being closed by the plug element 110 when it is not used to mount the actuating pin 84. Accordingly, either left hand or right hand switches may be provided with the same housing construction.

Considering now the operation of the optical fibre switch described thus far, when a force is exerted on the upper end of the actuator pin 84, the central portion 80 of the spring 74 is moved downwardly and when this portion has been moved sufficiently below the mounting plane, i.e. the end portions of the biasing arms 88, 90, the central portion 80 snaps to a reverse position in which it is bowed downward slightly. As a result, the end portion 78 is abruptly moved downwardly and carries the shutter element 58 downwardly within the slot 56 so that it blocks the transmission of light between the optical fibre cable end portions 46. Downward movement of the shutter element 58 is limited by engagement of the shoulders 58a (FIG. 5) with the bottom wall of the housing sections 10, 12 adjacent the slots 60 therein. Limitation of the downward movement of the shutter 58 occurs at a point where the central portion 80 is only slightly bowed downwardly. Accordingly, when the actuator pin 84 is released, the biasing arms 88, 90, which become slightly more bowed when the shutter 58 is moved downwardly, urge the central portion 80 back to its initial position shown in FIG. 2 with a snap action. If downward movement of the shutter 58 is not limited as described above the central portion 80 might initially snap so far down that the release of the actuator pin 84 would not bring about the desired return snap of the central portion 80 and movement of the shutter element 58 to its nonblocking position.

If it is desired to have the shutter element 58 normally block the transmission of light between optical fibre sections 46 when the pin 84 is in its uppermost position shown in FIG. 2 and establish light transmission in response to downward movement of this pin, the shutter 59 (FIG. 6) may be employed. The shutter 59 is somewhat longer than the shutter 58 and is provided with an aperture 59a which is moved into the area between the optical fibre end portions 46 when the central portion 80 is snapped to its downward position in response to downward movement of the actuator pin 84.

In this connection it will be understood that a force may be exerted on the upper end of the actuator pin 84 by any suitable lever arrangement, such as that employed in conventional microswitches, or the like.

In accordance with an important aspect of the present invention, the bushings 26, 28 are not molded as a part of the offset portion 24 of each housing section, but instead are assembled and coaxially aligned before they are secured to the offset portion 24. More particularly, in assembly, the subassembly 66, with the actuator pin 84 resting on the spring arm 80 and with the outer end portion 78 thereof extending through the shutter blade 58, is laid into one of the housing sections, such as the section 10, with the actuator pin 84 positioned in its mounting hole in the section 10 and the edge of the shutter blade positioned in the grooves 60 and 62.

The bushings 26 and 28 are also laid into the grooves formed by the flanges 50, 54 and the central rib 52 after which the other housing section 12 is placed over the flange portion of these bushings, the edge of the shutter blade 58 and the actuator pin 84. The housing sections are then secured together by means of the rivets 14, 16.

A cylindrical alignment pin 61 which makes a sliding fit with the cylindrical portions 32 of the central openings of the bushings 26, 28 is then inserted into the openings 30, 32 so that these bushings are precisely coaxially aligned. With this alignment pin in place the flange portions 48 of the bushings 26, 28 are then secured within the grooves formed in the offset portion 24 by any suitable means such as gluing or the like. Preferably, an instant glue containing a cyano-acrylate ester is employed to permanently mount the bushings 26, 28 with the central openings 32 precisely aligned co-axially.

After the bushings 26, 28 have thus been secured within the offset portion 24, the alignment pin is removed from the central openings 32 and optical fibre cable terminating ferrules 36 with the cables 41 positioned therein are then inserted within the openings 30, 32 of the bushings 26, 28 and the caps 40 are threaded onto these bushings with the end portions 46 in exact co-axial alignment. The bushings 26, 28 may thus be of standard commercial construction, so that standard terminating ferrules 36 and end caps 40 may be employed to terminate the optical fibre cables 41 while providing the above-described precise co-axial alignment between the end portions 46.

Figure 9:
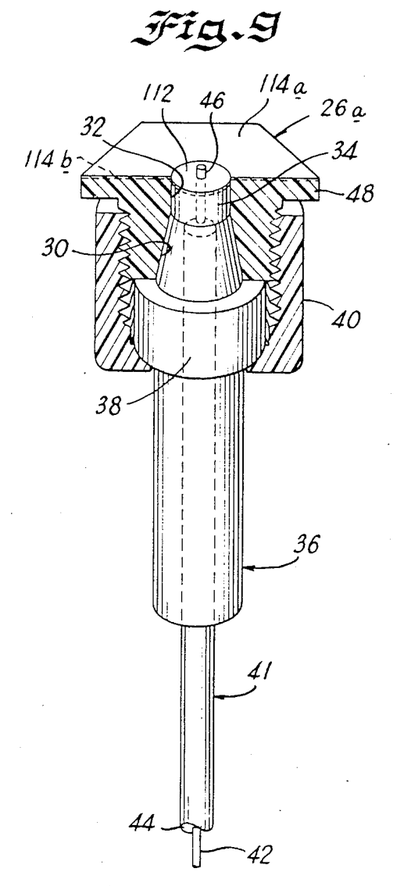
FIG. 9 is a perspective view of a polishing bushing arrangement employed in preparing the optical fibre cable ends in the switch of FIG. 1.
Figure 10:
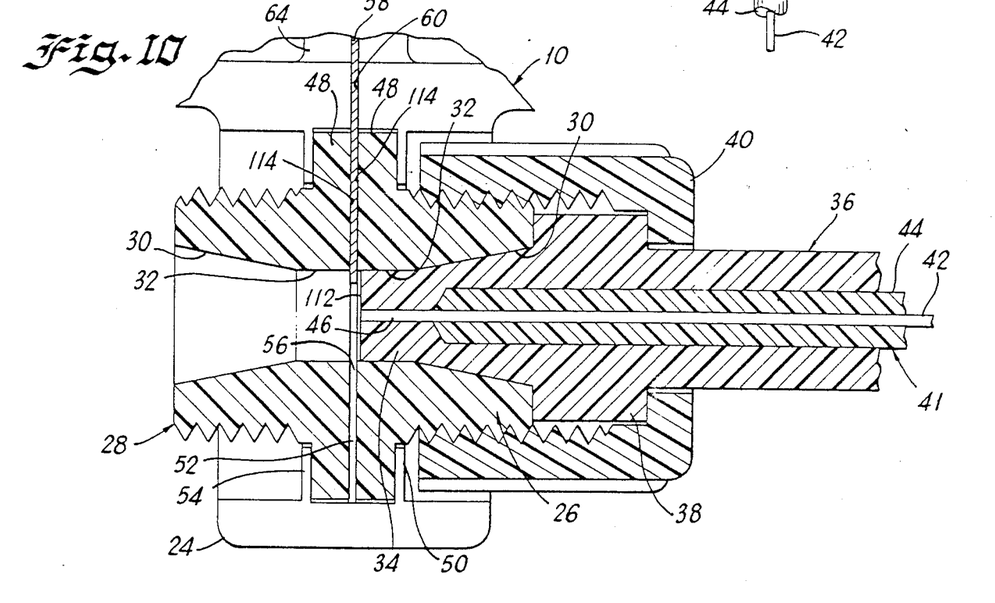
FIG. 10 is a fragmentary sectional view of a portion of the switch of FIG. 2, but taken on a somewhat larger scale.
Figure 11:
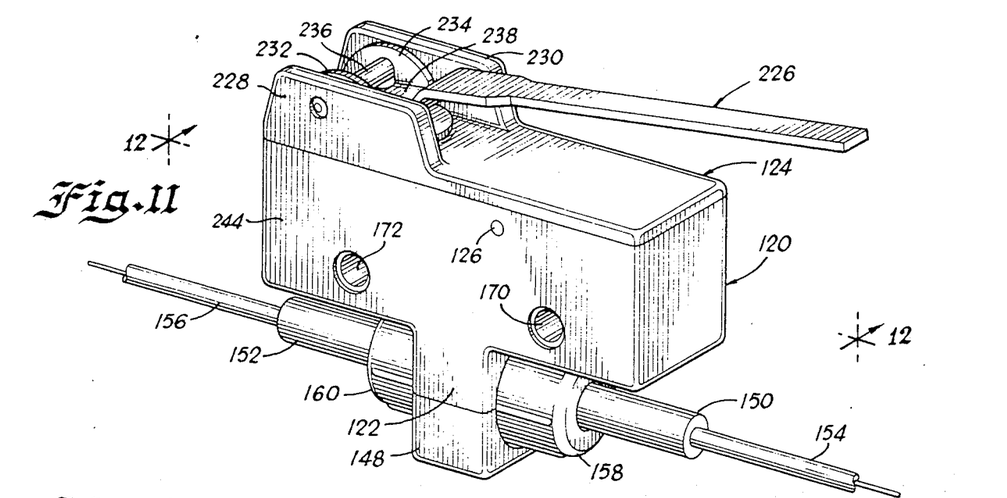
FIG. 11 is a perspective view of an optical fibre switch which is an alternative embodiment of the present invention.

In order to avoid wear on the end faces of the optical fibre end sections 46 as the shutter 58 is moved therebetween in response to movement of the actuator pin 84, and in accordance with an important aspect of the present invention, the end face 112 of the terminating ferrule 36 and the end of the optical fibre end portion 46 are both recessed relative to the end face 114 of the bushings, such as the bushings 26, as best illustrated in FIG. 10. Preferably, this slight recess of the end portions of the ferrule 36 and optical fibre cable portion 46 is achieved by first placing the ferrule 36 and optical fibre cable 41 in a polishing bushing 26a (FIG. 9) which is similar to the bushing 26 but separate from the optical fibre switch of the present invention, the ferrule 36 being secured to the bushing 26a by a cap 40. The end face of the bushing, the end portion 34 of the ferrule 36, and the end portion 46 of the cable 41 are then simultaneously ground down by rubbing these end portions on fine finishing paper with a rotary motion until the ends of the ferrule 34 and optical fibre cable 41 are polished smooth with respect to the end face 114a of the polishing bushing 26a. During this polishing operation, a small amount of the end face 114a of the polishing bushing 26a, indicated by the dotted line 114b in FIG. 9, is also removed. Then, when the ferrule 36 and cable 41 are removed from the polishing bushing 26a and placed in one of the bushings 26, 28 of the optical fibre switch of the present invention, the end faces of the portions 34 and 46 will be slightly recessed with respect to the end face 114 of the unpolished bushing 26, as shown in FIG. 10. Accordingly, the shutter 58 may be actuated within the slot 56 a large number of times without producing any wear on the recessed end portions of the ferrule 34 and optical fibre cable 46.

In FIGS. 11-21 of the drawings there is disclosed an alternative embodiment of the invention wherein certain features are provided which are different from the arrangement described in connection with FIGS. 1-10, inclusive. Referring to FIGS. 11-21, in this embodiment of the present invention the selfcontained optical fibre switch comprises a main housing indicated generally at 120, which is provided with a central offset portion 122, and a top cover indicated generally at 124 which is arranged to be seated in the top opening of the main housing 120 and is secured therein by means of the pins 126 which extend through the sidewalls 244 and 246 of the housing 120 and into the openings 128 of the cover 124. The offset portion 122 is provided with a pair of inwardly offset downwardly extending leg portions 130 and 132. Each of the legs 130, 132 is provided on the inner face thereof with a series of three inwardly extending parallel ridges 134, 136 and 138 which are adapted to receive therebetween the square flange portions 140 and 142 of a pair of standard optical fibre cable bushings indicated generaly at 144 and 146, respectively. After the bushings 144, 146 have been assembled within the offset portion 122 in accordance with an alignment procedure to be described in more detail hereinafter a bottom cover or cap 148 is placed over the downwardly extending leg portions 130, 132 and is secured to the offset portion 122 by any suitable means such as gluing, or the like. The bushings 144, 146 are adapted to receive standard terminating ferrules 150, 152 for the optical fibre cables 154, 156. After the ferrules 150, 152 have been positioned within these bushings 144 and 146, the end caps 158 and 160 are threaded onto the bushings 144 and 146 to hold the ferrules 150, 152 securely within the bushings. Both the offset portion 122 and the cap 148 are provided with semicircular openings 162 and 164, respectively, in the sidewalls thereof which provide clearance for the bushings 144, 146 and permit threading of the end caps 158 and 160 onto these bushings. The main housing 120 is provided with a pair of boss portions 166 and 168 (FIG. 12) which are provided in the bottom wall thereof and have the openings 170 and 172 extending therethrough. The openings 170 and 172 are employed to mount the optical fibre switch of the present invention on any suitable supporting panel, these openings preferrably having a diameter and spacing corresponding to conventional electrical switches so that the optical fibre switch of the present invention may be substituted therefor in existing electrical switch arrangements.

In accordance with an important aspect of the embodiment of FIGS. 11-21, of the present invention, the shutter element and its actuating spring arm and actuator pin may all be assembled on the cover plate 124 as a separate subassembly. Furthermore, the actuator pin spring arm and shutter may be tested for proper operation before this cover subassembly is positioned within the main housing 120. More particularly, the end portion 174 of the central switch actuating spring arm 176, and the central leg 178 of a bracket 180 are arranged to be secured to the bottom end of a boss portion 182 which extends downwardly from the cover 124. To this end, the boss 182 is provided with the opening 184 therein, the end portion 174 is provided with the opening 186 and the central leg 178 is provided with the opening 188, the rivet 190 extending through these aligned openings so as to secure the bracket 180 to the cover 124 and mount the end portion 174 of the spring arm 176 therebetween. The cover 124 is provided with another depending boss portion 192 which is provided with the opening 194 which is adapted to receive the shank portion 196 of an actuator pin indicated generally at 198, the rounded bottom end portion 200 of the actuator pin 198 being adapted to engage the central spring arm 176. The other end of the spring arm 176 is provided with a T-shaped portion 202, the edge of which extends through a slot 204 in the shutter element 206. The spring arm 176 is provided with a second opening 187 which is positioned between the bracket portion 178 (FIG. 18) and the head 200 of the actuator pin to permit the spring arm 176 to flex more easily in response to a force exerted on the pin 198.

Figure 12:
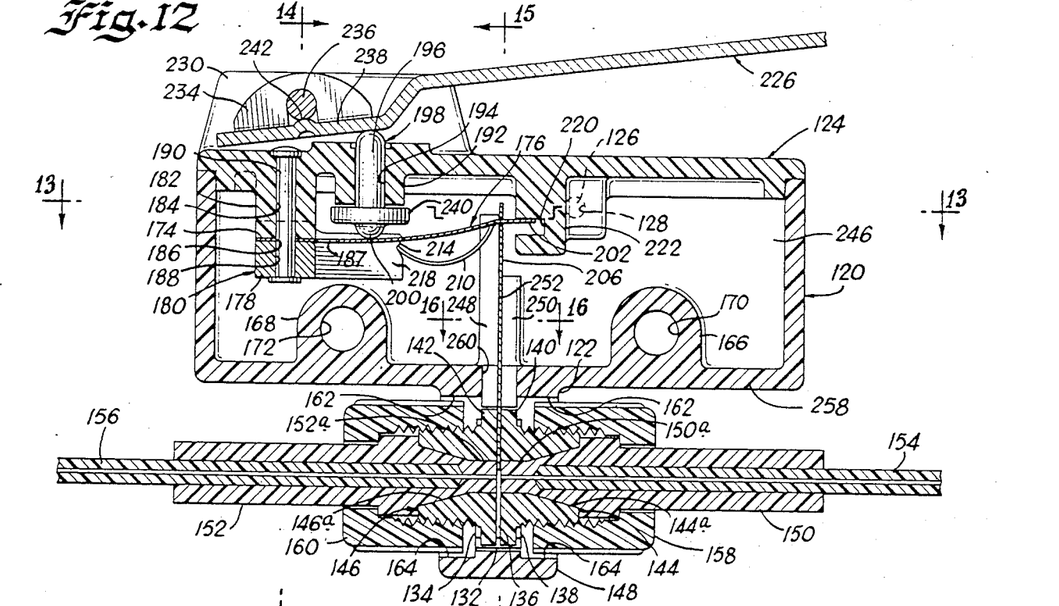
FIG. 12 is a sectional view taken along the line 12—12 of FIG. 11.
Figure 13:
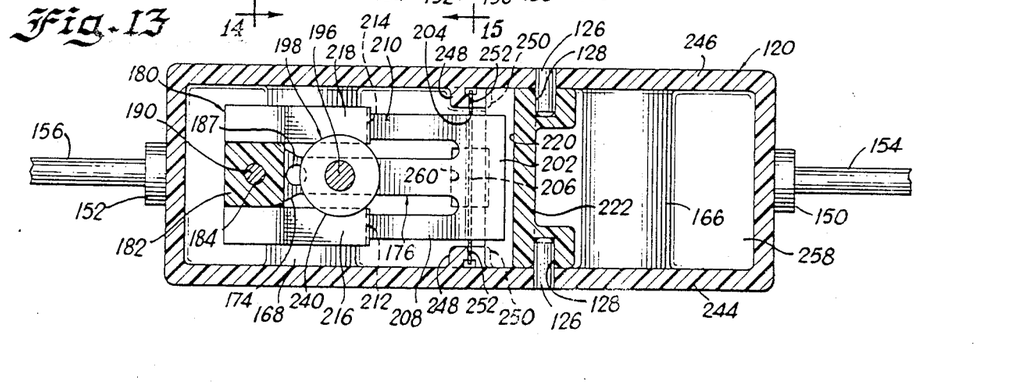
FIG. 13 is a plan sectional view taken along the line 13—13 of FIG. 12.
Figure 14:
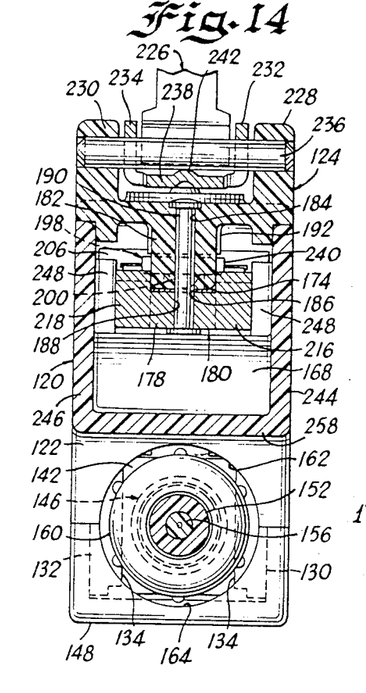
FIG. 14 is a cross-sectional view taken along the line 14—14 of FIG. 12.
Figure 15:
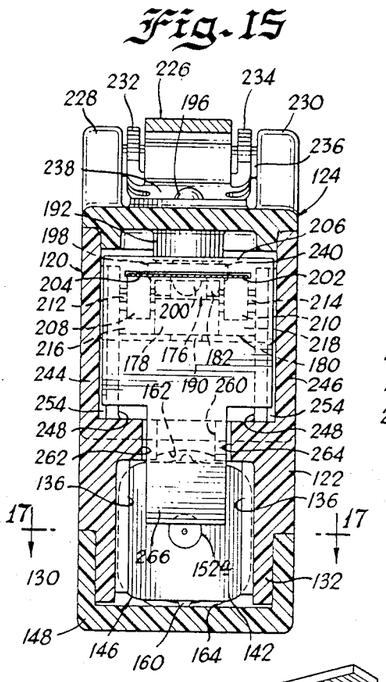
FIG. 15 is a cross-sectional view taken along the line 15—15 of FIG. 12.

A pair of spring biasing arms 208 and 210 which are integral with the outer ends of the T-shaped portion 202 are positioned in the grooves 212 and 214 provided in the ends of the arm portions 216 and 218 of the bracket 180. The outer end portion 202 of the spring arm 176, which extends through the slot 204 in the shutter 206 is movable within a groove 220 provided in a downwardly extending boss portion 222 of the cover 124. The bowed spring arms 208, 210 exert an upward force on this outer portion 202 so as to hold the spring arm 176 in an upwardly bowed condition in which the end portion 202 engages the top wall of the slot 220 in the absence of any downwardly directed force on the spring arm 176 by the actuator pin 198, as shown in FIG. 12.

When the actuator pin 198 is depressed by an external force, it moves the central flexible spring arm 176 downwardly until it is slightly below the pivot point of the spring arms 208, 210 i.e. the notches 212 and 214 in the bracket 180, at which time the spring arm 176 is snapped abruptly downwardly so as to move the shutter 206 abruptly downwardly in response to the force exerted on the actuator pin 198. Downward movement of the shutter 206 is limited by engagement of the end portion 202 with the bottom surface of the slot 220 in the cover 124. The cover 124 thus constitutes a separate subassembly which contains the actuator pin 198 and spring arm 176 and shutter blade 206 as a unitary subassembly which may be checked and tested before the cover 124 is assembled in the housing 120. This subassembly may then be inserted into the housing 120 in the manner illustrated in FIG. 21.

While the shutter 206 may be actuated in response to direct actuation of the pin 198, in the embodiment illustrated in FIGS. 11-21 actuation of the pin 198 accomplished by means of a lever arm 226 which is pivotally mounted on the cover 124. More particularly, the cover 124 is provided with a pair of upstanding sidewall portions 228 and 230 and the lever arm 226 is provided with the ears 232 and 234 which have suitable apertures therein for receiving a pin 236 which extends between the sidewalls 228 and 230. The lever arm 226 is provided with an offset end portion 238 which is adapted to engage the rounded upper end of the actuator pin 198 when the lever arm 226 is moved downwardly, it being understood that a substantial mechanical advantage is achieved by using the lever arm 226 so that a very accurate actuation of the switch arm 176 may be achieved by using the lever arm 226. In this connection it should be noted that the actuator pin 198 is provided with a bottom flange 240 the outer edges of which are adapted to seat on the top surface of the arms 216 and 218 of the bracket 180 and limit downward travel of the actuator pin 198. Accordingly, it is not possible by exerting force on the end of the lever arm 226 to damage the switch arm 176 or move it beyond the point at which it can be returned to the uppermost position shown in FIG. 12 when force is removed from the actuator pin 198. The offset portion 238 of the lever arm 226 is provided with an upstanding projection 242 which engages the bottom edge of the pin 236 so that play in the pivoted joint of the lever arm 226 is eliminated and accurate repeatable actuation of the pin 198 is provided.

Figure 16:
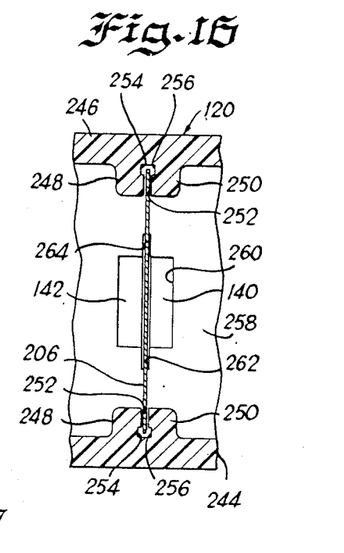
FIG. 16 is an enlarged partial plan sectional view taken along the line 16—16 of FIG. 12.
Figures 17, 18:
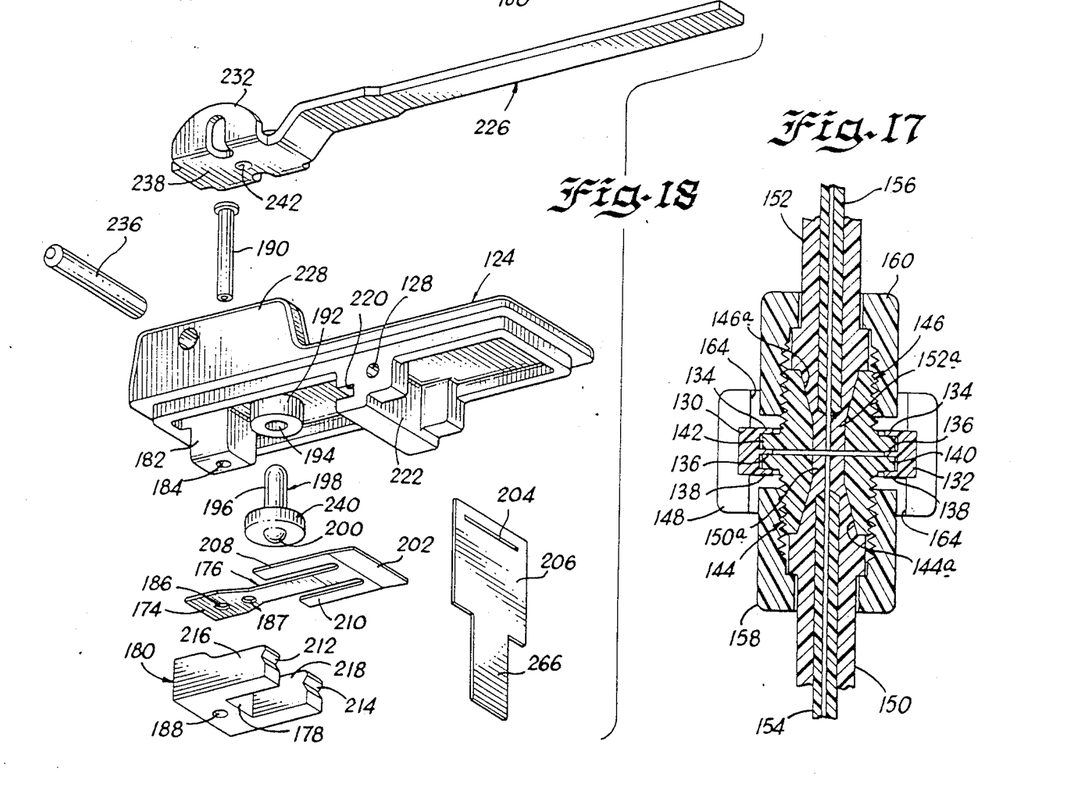
FIG. 17 is a plan sectional view taken along the line 17—17 of FIG. 15.
FIG. 18 is an exploded perspective view of the cover plate subassembly of the embodiment of FIG. 11.

Considering now the manner in which the cover subassembly is assembled in the main housing 120, it is first pointed out that the sidewalls 244 and 246 of the main housing 120 are each provided with a pair of vertically extending opposed, inwardly directed ridges 248, 250 (FIG. 16) which define therebetween a narrow slot 252 which is adapted to receive one edge of the shutter blade 206. As best illustrated in FIG. 16, the ridges 248 and 250 are provided with undercut portions 254 and 256 at the outer edge of the slot 252 so as to provide clearance at this outer edge of the slot 252 and to prevent binding of the shutter blade as it moves within the slot 252. The bottom wall 258 of the housing 120 is provided with an opening 260 having the slots 262 and 264 formed in opposite edges thereof in alignment with the slots 252 in the outer walls 244 and 246. The shutter blade 206 is provided with a bottom section 266 which is narrower than the upper portion of the shutter 206 and extends through the slots 262 and 264 into the offset portion 122 of the housing 120. More particularly, the narrow section 266 of the shutter 206 extends downwardly between the opposed ends of the optical fiber cables 154 and 156 so that the actuation of the shutter blade causes the end section 266 thereof to be interposed between the end faces of the optical fibre cables and prevent the transmission of light therebetween. In this connection it will be understood that the diameter of a typical optical fibre cable is very small, being in the order of 0.008 inches so that relatively small travel of the shutter section 266 in response to the snap action of the spring arm 176 is sufficient to move the shutter 206 from a nonlight blocking position when the spring arm end portion 202 engages the upper surface of the notch 220 to a lower position in which the end section 202 engages the bottom edge of the slot 220. The ridges 250 are shorter than the ridges 248, as best illustrated in FIG. 12, to provide clearance for the depending portion 222 of the cover 124. This arrangement has the additional advantage that assembly of the cover subassembly 124 in the housing 120 is simplified since the longer ridges 248 act as a guide to facilitate insertion of the shutter blade 206 within the grooves 252.

Figure 7:
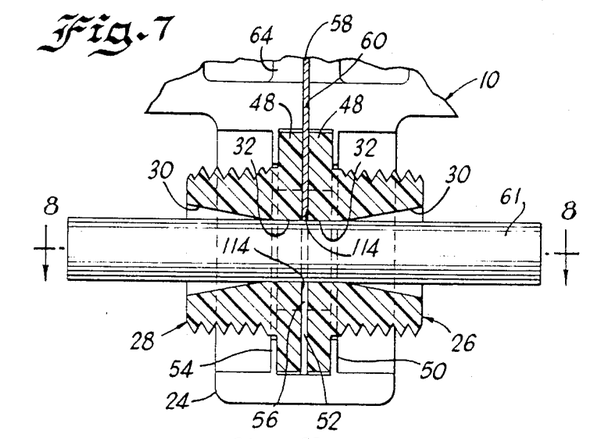
FIG. 7 is a fragmentary view of a portion of the switch of FIG. 2 on a somewhat larger scale and showing the alignment pin of the present invention.
Figure 8:
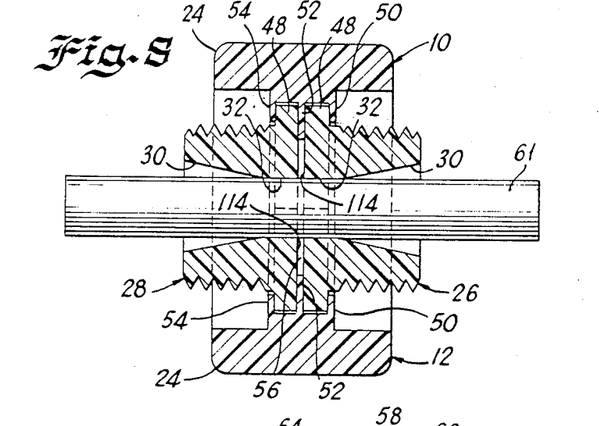
FIG. 8 is a sectional view taken along the line 8—8 of FIG. 7.
Figures 19, 20, 21:
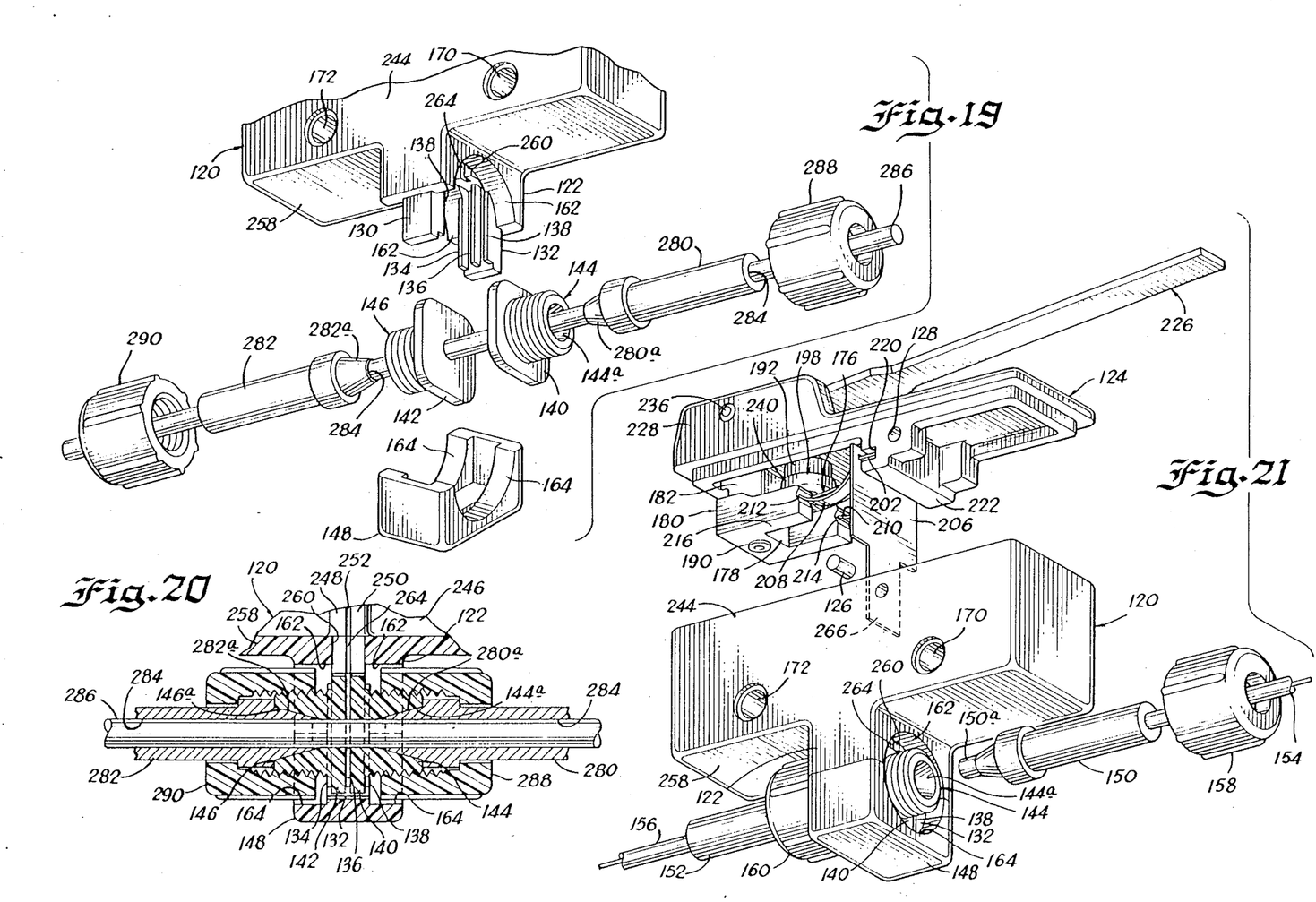
FIG. 19 is an exploded perspective view showing a preferred arrangement for aligning the optical fibre bushings in the embodiment of FIG. 11.
FIG. 20 is a fragmentary cross-sectional view of the alignment arrangement of FIG. 19 taken along the axis of the coaxially aligned optical fibre cables.
FIG. 21 is an exploded perspective view of the switch of FIG. 11 showing the manner in which the component parts thereof are assembled.

In the alignment procedure shown in FIGS. 7 and 8 of the drawings and described in connection with the embodiment of FIGS. 1-10, inclusive, the central bore portions 32 of the bushings 26, 28 are of relatively short length with the result that one or both of the bushings 26, 28, may be slightly cocked, even though it is positioned on the alignment pin 61 during the assembly of the flanges 48 within the offset portion 24. In FIGS. 19 and 20 an improved alignment procedure is shown which is preferably employed in assembling the standard optical fibre cable bushings to the offset switch portion in either the embodiment of FIGS. 1-10 or the embodiment of FIGS. 11-21, this alignment procedure being described in detail in connection with the embodiment of FIGS. 11-21. More particularly, a pair of aluminum ferrules 280 and 282 are employed during the alignment procedure. The aluminum ferrules 280 and 282 have an outward shape similar to the standard cable terminating ferrules 150 and 152 which are normally employed to assemble an optical fibre cable to the bushings 144 and 146, except for the fact that the end portions 150a and 152a (FIG. 17) of the standard cable terminating ferrules 150 and 152 are removed in the aluminum alignment ferrules 280 and 282 shown in FIG. 19. Furthermore, each of the aluminum ferrules 280 and 282 is provided with an enlarged central opening 284 which is of the same diameter throughout the length of the ferrule and is adapted to provide a close fit with an alignment pin 286 which extends thorugh the central bores 287 of the standard bushings 144, 146. By eliminating these end sections 150a and 152a, the ferrules 280 and 282 are provided with conical end sections 280a and 282a which may be wedged into the conical openings 144a and 146a of the bushings 144 and 146 to prevent these bushings from tilting during assembly.

During the alignment procedure shown in FIGS. 19 and 20, two standard bushings 144 and 146 are first assembled on the alignment pin 286 after which the aluminum alignment ferrules 280 and 282 are inserted on the opposite ends of the alignment pin 286. The flange portions 140, 142 of the bushings 144, 146 are inserted between the ridges 138, 136 and the ridges 136, 134, respectively and the conical end sections 280a and 282a of the ferrules 280, 282 are wedged tightly into the corresponding conical openings in the bushings 140 and 146 by placing standard end caps 288 and 290 over the ends of the alignment pin 286 and threading these end caps onto the bushings 144 and 146. When the bushings 144 and 146 have thus been assembled and aligned on the alignment pin 286, the flange portions 140 and 142 of these bushings are then secured to the outer ridges 134 and 138 on each of the legs 130 and 132 of the offset housing portion 122 by any suitable means such as gluing or the like, as discussed in detail heretofore in connection with the alignment procedure of FIGS. 7 and 8. After the bushings 144 and 146 have thus been secured within the offset portion 122, the end caps 288 and 290 are removed from the bushings 144 and 146 and the alignment ferrules 280 and 282 are removed from these bushings as well as the alignment pin 286. The bushings 144 and 146 are thereby accurately aligned so that optical fibre cable terminating ferrules 150 and 152 of standard construction with the cables 154 and 156 positioned therewithin may be inserted into the bushings 144 and 146 and secured with standard end caps 158 and 160 (FIG. 21). Preferably the end portions of the ferrules 150 and 152 are slightly recessed by the polishing procedure described in detail heretofore in connection with FIGS. 9 and 10.

While the optical fibre cables are shown in FIGS. 2 and 12 as extending in a straight line from the bushings 26, 28, or the bushings 144, 146, respectively it will be appreciated that the ferrules 36 or 150, 152 may be formed at any desired angle so as to permit the optical fibre cables to approach the switch from any desired direction. Such alternate angles of optical fibre cable entry may be necessary in certain applications of the disclosed optical fibre switch when this switch is used as a replacement for standard electrical switches with their associated wiring.

It will be understood that the use of the optical fibre switch arrangement of the present invention are not limited to the replacement of electrical switches on existing devices but may be utilized wherever control of the transmission of light through optical fibre cables is desired, including but not limited to usage in adverse environments such as potentially explosive areas or areas with magnetic interference.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an optical fibre switch, the combination of, a hollow support member having a central offset portion, means defining a slot in the walls of said support member and extending into said offset portion, means defining an opening in said offset portion extending in a direction perpendicular to said slot, a pair of positioning shoulders spaced along the length of said opening and extending inwardly thereinto, means defining an inwardly extending ridge positioned between said shoulders and in alignment with said slot to provide a pair of troughs between said ridge and respective ones of said shoulders, a pair of bushings each having a flange portion adjacent one end thereof and having a central bore adapted to receive an optical fibre cable terminating ferrule, means securing said flanges of said bushings in opposed relation in said troughs with said central bores thereof in precise coaxial alignment, and a shutter blade positioned in said slot and movable between the opposed flanged ends of said bushings to affect the transmission of light between optical fibre cables positioned in said central bores.

2. The combination of claim 1, which includes a blade actuating member positioned within said hollow support member, said blade actuating member extending generally perpendicular to said slot and having an end portion connected to said shutter blade.

3. The combination of claim 2, wherein said blade actuating member is a thin, flexible member one end of which is relatively fixed within said support member and the other of which extends through a slot in said shutter blade.

4. The combination of claim 1, which includes a shutter blade actuating subassembly positioned within said support member, said subassembly including a bracket and a flexible shutter blade actuating element having one end secured to said bracket and the other end connected to said shutter blade.

5. The combination of claim 4 wherein said actuating element includes at least one biasing arm extending between said other end of said actuating element and a point on said bracket, said biasing arm being bowed in the direction to force said other end of said actuating element upwardly in the absence of a force exerted on the top of said actuating element.

6. The combination of claim 5, which includes an actuator pin movably mounted in the top wall of said hollow support member and having a portion in engagement with said actuating element at a point intermediate the ends thereof.

7. The combination of claim 6, wherein movement of said actuating element downwardly to a point below said point on said bracket causes said actuating element to be bowed in the opposite direction with a snap action so that said shutter element is rapidly moved downwardly.

8. The combination of claim 4, wherein said actuating element includes a central elongated portion and a pair of spring biasing arms positioned on either side of said central portion and having one end thereof connected to said other end of said actuating element, the other ends of said biasing arms being connected to points on said bracket so that said biasing arms are bowed in the direction to force said other end of said actuating element upwardly in the absence of a force exerted on said actuating element.

9. The combination of claim 1, which includes a shutter blade actuating bracket positioned within said support member and having a pair of wall portions connected together by a central leg, and a flat, thin, flexible shutter blade actuating element having one end secured to said central leg of said bracket and the other end extending through a slot in said shutter blade.

10. The combination of claim 9 wherein said actuating element includes at least one biasing arm extending between said other end of said actuating element and a point on said bracket, said biasing arm being bowed in the direction to force said other end of said actuating element upwardly in the absence of a force exerted on the top of said actuating element.

11. The combination of claim 10 which includes an actuator pin movably mounted in the top wall of said hollow support member and having a portion in engagement with said actuating element at a point intermediate the ends thereof.

12. The combination of claim 11, wherein movement of said actuating element downwardly to a point below said point on said bracket causes said actuating element to be bowed in the opposite direction with a snap action so that said shutter element is rapidly moved downwardly.

13. The combination of claim 9, wherein said actuating element includes a central elongated portion and a pair of spring biasing arms positioned on either side of said central portion and having one end thereof connected to said other end of said actuating element, the other ends of said biasing arms being connected to points on said sidewalls of said bracket so that said biasing arms are bowed in the direction to force said other end of said actuating element upwardly in the absence of a force exerted on said actuating element.

14. In an optical fibre switch, the combination of, a hollow support member having a central offset portion, means defining a slot in the walls of said support member and extending into said offset portion, means defining an opening in said offset portion extending in a direction perpendicular to said slot, a pair of optical fibre cable bushings mounted in spaced apart relation in said opening and each adapted to receive an optical fibre cable terminating ferrule, a shutter blade positioned in said slot and movable between said bushings to affect the transmission of light between said ferrules, and a shutter blade actuating subassembly positioned within said support member, said subassembly including a bracket and a flexible shutter blade actuating element having one end secured to said bracket and the other end extending through a slot in said shutter blade.

15. The combination of claim 14 wherein said actuating element includes at least one biasing arm extending between said other end of said actuating element and a point on said bracket, said biasing arm being bowed in the direction to force said other end of said actuating element upwardly in the absence of a force exerted on the top of said actuating element.

16. The combination of claim 15 which includes an actuator pin movably mounted in the top wall of said hollow support member and having a portion in engagement with said actuating element at a point intermediate the ends thereof.

17. The combination of claim 16 wherein movement of said actuating element downwardly to a point below said point on said bracket causes said actuating element to be bowed in the opposite direction with a snap action so that said shutter element is rapidly moved downwardly.

18. The combination of claim 14 wherein said actuating element includes a central elongated portion and a pair of spring biasing arms positioned on either side of said central portion and having one end thereof connected to said other end of said actuating element, the other ends of said biasing arms being connected to points on said bracket so that said biasing arms are bowed in the direction to force said other end of said actuating element upwardly in the absence of a force exerted on said actuating element.

19. In an optical fibre switch, the combination of, a hollow support member having a central offset portion, means defining a slot in the walls of said support member and extending into said offset portion, means defining an opening in said offset portion extending in a direction perpendicular to said slot, a pair of optical fibre cable bushings mounted in spaced apart relation in said opening and each adapted to receive an optical fibre cable terminating ferrule, a shutter blade positioned in said slot and movable between said bushings to affect the transmission of light between said ferrules, a shutter blade actuating bracket positioned within said support member and having a pair of wall portions connected together by a central leg, and a flat, thin, flexible shutter blade actuating element having one end secured to said central leg of said bracket and the other end extending through a slot in said shutter blade.

20. An optical fibre switch, comprising a pair of identical housing sections each having a side opening recess and an offset portion, means securing said housing sections together with said recesses facing each other to form a switch actuating chamber, means defining a slot in the walls of said chamber and extending into said offset portions, means defining an opening in said offset portions extending in a direction perpendicular to said slot, a pair of optical fibre bushings mounted in spaced apart relation in said opening and each adapted to receive an optical fibre cable terminating ferrule, a shutter blade positioned in said slot and movable into the space between said bushings to affect the transmission of light between said ferrules, a blade actuating member extending generally perpendicular to said slot within said chamber and connected to said shutter blade, said housing sections having openings in the top wall thereof which are positioned on either side of said slot, an actuating pin positioned in one of said openings and in engagement with said blade actuating member, and a plug in the other of said openings.

21. The optical fibre switch of claim 20, wherein said slot is positioned at the center of said chamber and said blade actuating member may be mounted in said chamber on either side of said slot.

22. An optical fibre switch, comprising a pair of identical housing sections each having a side opening recess and an offset portion, means securing said housing sections together with said recesses facing each other to form a switch actuating chamber, means defining a slot in the walls of said chamber and extending into said offset portions, means defining an opening in said offset portions extending in a direction perpendicular to said slot, a pair of optical fibre bushings mounted in spaced apart relation in said opening and each adapted to receive an optical fibre cable terminating ferrule, a shutter blade positioned in said slot and movable into the space between said bushings to affect the transmission of light between said ferrules, a blade actuating member extending generally perpendicular to said slot within said chamber and connected to said shutter blade, said blade actuating member being mounted on a blade actuating subassembly, and means in said chamber for retaining said subassembly on either side of said slot with said end portion of said blade actuating member connected to said shutter blade.

23. In an optical fibre switch of the type having a pair of opposed bushings, each bushing being provided with an end face around a central opening into which an end portion of an optical fibre cable and a surrounding terminating ferrule may be inserted, each bushing, cable and surrounding ferrule having an aligned group of end faces in spaced apart facing relation with an opposed group of end faces of the other bushing, cable and surrounding ferrule, and a light blocking member movable in a path defined between said opposed end faces, the method of providing a recess between said opposed groups of said end faces, which method comprises the steps of first placing the terminating ferrule and optical fibre cable of one group in a polishing bushing similar to one of said bushings of said switch, removing material from the exposed end faces of said ferrule, said optical fibre cable and said polishing bushing of said one group until said exposed end faces are polished smooth, then removing said ferrule and said optical fibre cable of said one group from said polishing bushing and inserting the polished ferrule and optical fibre cable in the central opening of one of said pair of bushings of said optical fibre switch.

24. An optical fibre switch, comprising a housing having a central offset portion, a shutter blade slidably mounted in said housing and movable into said offset portion, said offset portion having means for retaining a pair of cable terminating bushings in opposed coaxial relation on either side of said shutter blade, and a blade actuating member extending generally perpendicular to said shutter blade in said housing and connected to said shutter blade, said offset portion including a pair of opposed downwardly extending legs having grooves in the facing sides thereof for receiving flange portions of said pair of opposed bushings, and a bushing cap positioned on the bottom end of said legs and enclosing the bottom portion of said bushing flanges.

25. An optical fibre switch as set forth in claim 24, which includes a cover for the side of said housing opposite said offset portion, and means for supporting said blade actuating member on said cover.

26. An optical fibre switch as set forth in claim 25, wherein said blade actuating member comprises an elongated flexible element having one end secured to said cover and the other end connected to said shutter blade.

27. An optical fibre switch as set forth in claim 26 wherein said actuating element includes at least one biasing arm extending between said other end of said element and a point on said cover, said biasing arm being bowed in the direction to force said other end of said actuating element upwardly in the absence of a force exerted on the top of said actuating element.

28. An optical fibre switch as set forth in claim 27, which includes an actuator pin movably mounted in said cover and having a portion in engagement with said actuating element at a point intermediate the ends thereof.

29. An optical fibre switch as set forth in claim 28, wherein movement of said actuating element downwardly to a point below said point on said cover causes said other end of said actuating element to move rapidly downward.

30. An optical fibre switch as set forth in claim 25, which includes a bracket secured to said cover, and said blade actuating member comprises an elongated flexible member one end of which is positioned between said bracket and said cover and the other end of which is connected to said shutter blade.

31. An optical fibre switch as set forth in claim 30, wherein said actuating element includes a central elongated portion and a pair of spring biasing arms positioned on either side of said central portion and connected to said other end of said actuating element, the other end of said biasing arms being connected to points on said bracket so that said biasing therefore arms are bowed in the direction to force said other end of said actuating element upwardly in the absence of a downward force exerted on said actuating element.

32. An optical fibre switch as set forth in claim 32, which includes an actuator pin mounted in said cover for vertical movement, the bottom end of said actuator pin engaging said elongated central portion at a point intermediate the ends thereof.

33. An optical fibre switch as set forth in claim 24, wherein said housing includes a pair of opposed side walls, and a pair of vertically extending inwardly directed ribs on each of said opposed side walls and forming therebetween a slot adapted to receive one edge of said shutter blade.

34. An optical fibre switch as set forth in claim 33, wherein said ribs are provided with undercut portions at the outside edges of said slots to prevent binding of said shutter blade during movement thereof within said slots.

35. An optical fibre switch as set forth in claim 33, which includes a removable cover for the side of said housing opposite said offset portion, and means for supporting said shutter blade on said cover, one rib of each of said pair of ribs being longer than the other to facilitate insertion of said edges of said shutter blade into said slots when said cover is mounted on said housing.

* * * * *